Figures 1, 2:
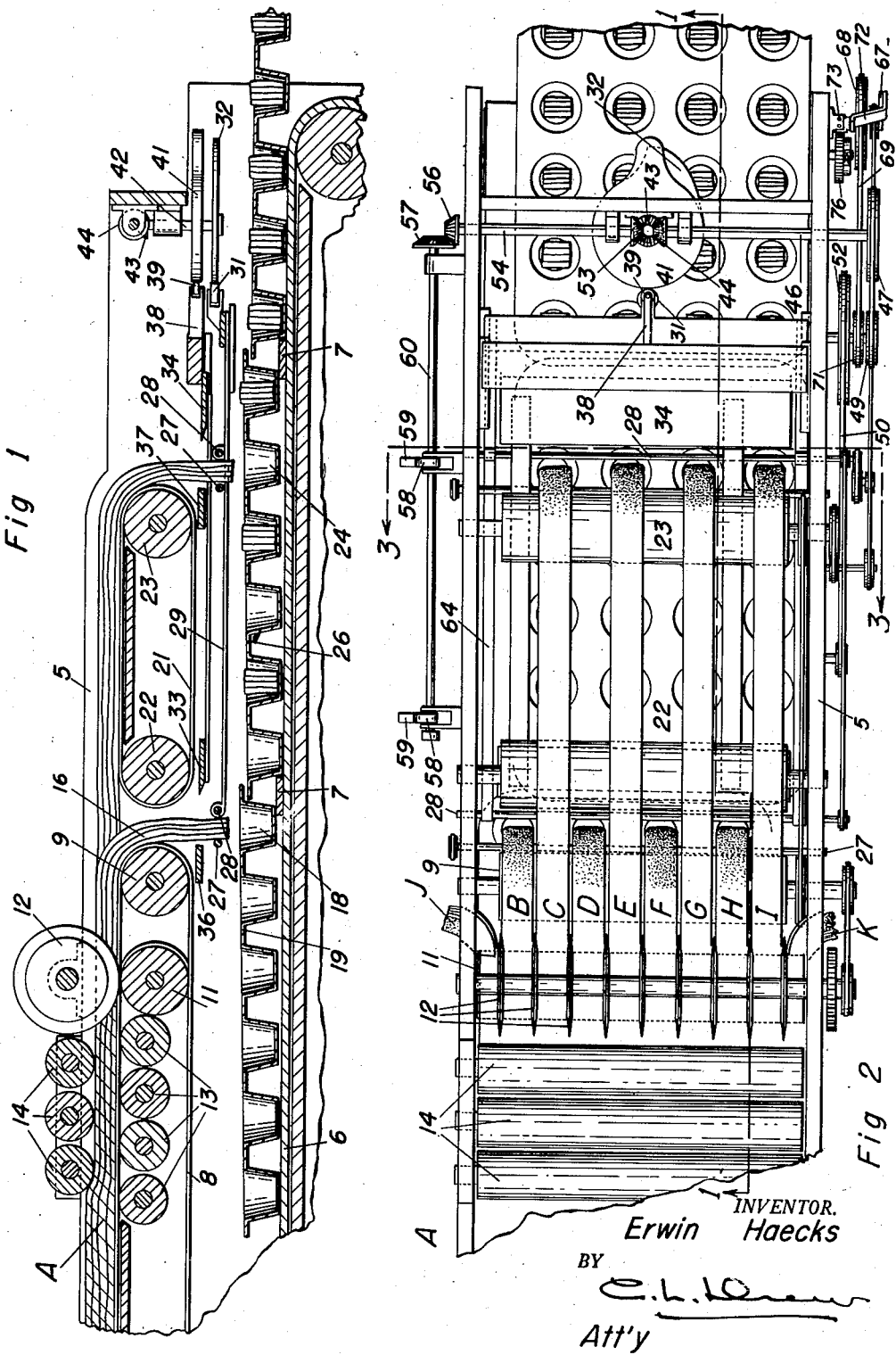

Oct. 30, 1951  E. HAECKS  2,573,100
MECHANISM FOR MOVING PANS IN DOUGH CUTTERS
Filed Nov. 17, 1948  2 SHEETS—SHEET 1

INVENTOR.
Erwin Haecks
BY
Att'y

Oct. 30, 1951  E. HAECKS  2,573,100
MECHANISM FOR MOVING PANS IN DOUGH CUTTERS
Filed Nov. 17, 1948  2 SHEETS—SHEET 2
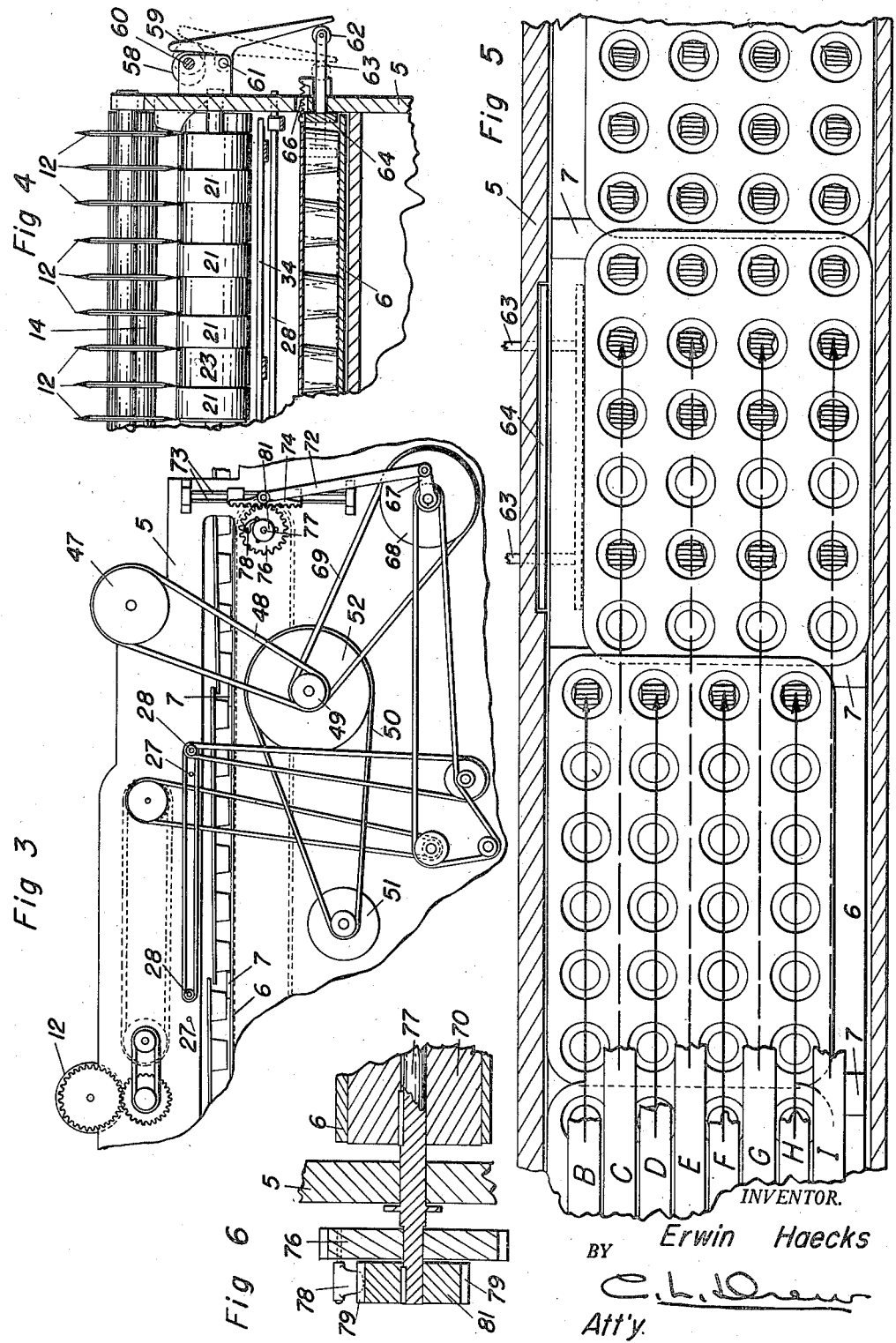
INVENTOR.
Erwin Haecks
BY
Att'y.

Patented Oct. 30, 1951

2,573,100

UNITED STATES PATENT OFFICE 2,573,100

MECHANISM FOR MOVING PANS IN DOUGH CUTTERS

Erwin Haecks, San Francisco, Calif.

Application November 17, 1948, Serial No. 60,555

1 Claim. (Cl. 226—2)

This invention relates to improvements in a mechanism for moving pans in dough-cutting machines.

The principal object of this invention is to provide means for moving muffin pans progressively through a dough-cutting machine in a step-by-step movement and to further provide side movement of the pans after they have travelled a predetermined distance.

A further object is to provide means for momentarily stopping each row of cups formed in the pan in exact alignment with dough being discharged from travelling belts so that said dough will be discharged into alternate rows of cups, the remaining alternate rows to be filled after said pans have been moved sidewise.

A further object is to provide means for advancing the pans rapidly and yet to provide a slowing down of the rapid movement so that there is no danger of the inertia in the pans to cause them to slide out of position.

Other objects and advantages will be apparent during the course of the following description.

In the accompanying drawings forming a part of this specification and in which like numerals are employed to designate like parts throughout the same, Fig. 1 is a fragmentary cross-sectional view taken on the line 1—1 of Fig. 2, and showing the position of the pans ready to receive cut dough, Fig. 2 is a fragmentary top-plan view of my device, Fig. 3 is a fragmentary side-elevational view of the driving mechanism shown at the right-hand end of Fig. 2, Fig. 4 is a cross-sectional view taken on the line 3—3 of Fig. 2, Fig. 5 is a top-plan view of the muffin pans as they appear upon the conveyor during movement through the machine, and Fig. 6 is an enlarged fragmentary detail view of the conveyor driving dog gear in construction.

In my Patents 2,454,316 of November 23, 1948, and 2,472,073 of June 6, 1949, I describe a machine for cutting flats of laminated dough into strips, which strips are, in turn, cut and deposited in individual cups or muffin pans in such a manner that the laminations are vertically arranged, whereby, after raising and baking, what is known as "Butter Gems" are produced.

Due to the construction of muffin pans and the splitting of the laminated dough into parallel strips, it is necessary to move the pans in the machine in a step-by-step motion so that, at the two points of the discharge of the alternate parallel dough strips, these alternate strips will be deposited in alternate rows of the cups of the muffin pans. Also, the muffin pans, in their travel through the machine, must be moved sidewise so as to receive the remaining alternate strips of dough in the remaining alternate cups of the pan, with the result that, when a pan has passed through the machine, all of the dough cut will have been deposited in the cups and all cups filled.

Also, it is necessary to advance the pans rather quickly from one position to the next. However, this movement cannot be too rapid, as it will cause the pans to slide upon the conveyor and, therefore, I have provided means for starting the conveyor belt upon which the pan rests, slowly, speeding up this movement, and then slowing it down so that the pans will come to rest in the proper position and without any danger of slippage. And as the dough is being cut into parallel strips, it is obvious that some of the strips would fall between the parallel aligned cups of the pans. Therefore, it is necessary to provide means for receiving these alternate strips and this is accomplished by moving the pans sidewise, as will be later described.

In the accompanying drawings, wherein, for the purpose of illustration, is shown a preferred embodiment of my invention, the numeral 5 designates the frame of the machine as a whole which serves to support the cutting and depositing mechanism herein briefly referred to, and explained in more detail in my co-pending applications.

At 6 I have shown a conveyor belt having cross pieces 7, which serve as stops against which the pans are abutted at their rear ends, having their forward rows of cups resting upon the next forward cross piece. These pans are manually placed on the conveyor with the line of cups abutting one of the cross pieces so that the cross piece will push the pan as the conveyor moves. This is clearly illustrated in Fig. 1, and it will here be noted that the tops of the adjacent pans overlap each other in spaced vertical relation, which permits the adjacent horizontally-arranged cups of the two pans to be the same distance apart as are the adjacent cups of the individual pans. Further, this vertical spacing not only permits the cups in the adjacent pans to be properly spaced, but also prevents any undue friction between the pans when the same are moved sidewise in relation to each other, as will be later described.

Positioned in the frame 5, and above the line of movement of the pans is a plurality of dough conveyor belts 8, in side-to-side relation. These belts pass over a roller 9, and a knife-engaging roller 11, which is adapted to be contacted by a plurality of driven knives 12, passing between the belts 8.

These belts 8, are supported by rollers 13, so that a flat of dough upon the belts 8, will be compressed to a uniform thickness by rollers 14, previous to being cut by the knives 12, into the strips B, C, D, E, F, G, H and I. The edges of the dough are discharged as shown at J and K.

The strips B, D, F and H pass downwardly, as shown at 16 in Fig. 1 and into alignment with the first horizontal line of cups 18, in the pan 19.

The ends of the strips C, E, G and I, are manually lifted over the gap between the rollers 9 and 12 and placed on a second series of conveyor belts 21, supported on rollers 22 and 23. These last-mentioned strips C, E, G and I, will be discharged from the conveyors 21, into the cups 24 of the pan 26. As the dough is fed downwardly from the conveyor belts toward the cups in the pans, it is, in turn engaged by driven stationary feed rollers 27, and driven movable feed rollers 28, which are connected by a rod 29, and moved forwardly by a roller 31, engaged by a cam 32. The purpose of these rollers is to support the dough as it moves downwardly, just previous to the cutting off of small sections through the action of reciprocating knives 33 and 34, which contacts cutting blocks 36 and 37 respectively.

These knives 33 and 34, are moved against their cutting blocks through the medium of an arm 38, having a roller 39, engaging a cam 41. These cams 32 and 41, are mounted upon a shaft 42, and driven by beveled gears 43 and 44, the gear 44 being mounted upon a shaft 46, and rotated by a pulley 47.

A belt 48, is driven by a pulley 49, which is, in turn, rotated through the medium of a motor 51 and belt 50, driving a pulley 52, connected thereto.

The beveled gear 43, meshes with a beveled gear 53, which, in turn, drives a shaft 54, and, through beveled gears 56 and 57, rotates a pair of cams 58, mounted on the shaft 60, which, in turn, actuate levers 59, pivoted as at 61, to the frame 5, the lower ends of these levers engaging rollers 62, which rollers are supported on pusher arms 63, connected to a pusher bar 64.

Springs 66, tend to retract this bar.

In order to move the conveyor 8, I provide a crank arm 67, which is mounted upon a pulley 68, and driven by a belt 69, from the pulley 71.

As this crank arm rotates, it actuates a connecting rod 72, moving on parallel rods 73, and actuating a rack 74, which engages a gear 76, freely rotatable on the shaft 77.

This gear carries a spring-pressed dog 78, which is adapted to have its nose brought into abutting engagement with stops 79, formed upon the periphery of the disc 81.

The result of this construction is that, when a flat of laminated dough is placed upon the conveyor belts 8 at the left of the machine, and the machine set in operation, the belts 8, will carry the dough under the roller 14, thus compressing it to a uniform thickness.

The dough will now pass between the knives 12, and will be cut into strips. The strips J and K, at the sides (see Fig. 2) will be discharged from the machine as trimmings. The remaining strips B to I inclusive, will proceed forwardly. The strips B, D, F and H, will pass downwardly over the end of the conveyor belts 8, and their supporting roller 9, toward the horizontal line of cups 18. The strips C, E, G and I, will be manually lifted across the gap between the conveyors 8 and the conveyors 21, and placed on the conveyors 21 to eventually be delivered over the supporting roller 23 and downwardly toward the horizontally-aligned cups 24.

At the same time and during the movement of this dough, the cams 32 and 41, have been continuously rotating, with the result that, at predetermined times, these cams will first cause the rod 29, to move forwardly so that the roller 28, will hold the downwardly-extending strips of dough momentarily while the cutters 33 and 34, move against their cutting blocks and cut off the proper length of dough from each strip. As the rollers 28, move away from the dough, cut cut-off piece will be dropped into the horizontally-aligned pans and, as soon as this occurs, the pans will be moved forward as follows:

The crank 67, as it is being rotated by the motor 51, through the belts 50, pulley 52, pulley 49, belt 69 and pulley 68, will cause the connecting rod 72, to move the rack 74, upwardly and downwardly on the parallel rods 73. This, in turn, will cause the gear 76, to reciprocate back and forth on the shaft 77 (see Fig. 6) and, as a consequence, the dog 78, will have its nose intermittently brought into engagement with one of the stops 79, formed on the periphery of the disc 81.

As the shaft 77, supports the roller 70, over which the conveyor 6, passes and forms the driving connection to the conveyor, it will be obvious that the conveyor will be given a step-by-step movement and, as the reciprocating action of the rack 74, is similar to that of the movement of a piston which slows up at both ends of its travel, the transmitted movement of the rack will, therefore, cause the conveyor 6, to start to move slowly, increase in speed and then slow down at the end of its travel.

The arrangement of the stops 79, is such that the conveyor will be moved just the distance from the center line of one horizontal line of pans to the next alternate horizontal line of pans. Therefore, when a pan is moved away from its filling position at the end of the conveyors 8, only the first, third and fifth rows in the pan will have been filled. Consequently, in order to fill the second, fourth and sixth rows in the pan, the pan must be moved sidewise so as to bring these last-mentioned pans into alignment with the strips being discharged from the conveyors 21. In order to accomplish this, a pusher 64, actuated by the cams 58 and levers 59, engages the side of the pan and moves the same sidewise, as illustrated in Fig. 5, the pusher being shown in full lines, and also in dotted-line position.

When the pan has been filled, it will be discharged from the end of the machine, ready to be placed in the racks for raising and delivery to the ovens.

In Fig. 5 I have shown, by solid arrows and by broken arrows, the delivery of the various strips of dough to the pans, as they proceed through the machine.

It will thus be seen that I have devised a mechanism for moving pans in a dough-cutting machine which will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

Means for filling pans in a dough-cutting mechanism comprising a conveyor belt passing over a driving roller and having raised longitudinally spaced stops positioned thereon for positioning pans on said conveyor, said stops having their adjacent edges spaced a distance less than the length of the bottom of the pan, whereby one end of the pan will engage one of said stops and the other end of the pan will rest on the next adjacent stop, means for advancing said conveyor in a step by step movement, said means including an intermittently driven gear carried by said driving roller, and a reciprocating crank-operated rack engaging said gear, whereby the movement of said conveyor has a cycle of movement progressively increasing and decreasing in speed during each step.

ERWIN HAECKS.

REFERENCES CITED

The following references are of record in the file of this patent:

UNITED STATES PATENTS

| Number | Name | Date |
|---|---|---|
| 1,095,669 | Paterson | May 5, 1914 |
| 2,079,778 | Thom | May 11, 1937 |
| 2,366,366 | Souder | Jan. 2, 1945 |
| 2,380,564 | Wennmann | July 31, 1945 |